(12) United States Patent
Brems

(10) Patent No.: US 6,505,161 B1
(45) Date of Patent: Jan. 7, 2003

(54) SPEECH RECOGNITION THAT ADJUSTS AUTOMATICALLY TO INPUT DEVICES

(75) Inventor: Douglas J. Brems, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/564,393

(22) Filed: May 1, 2000

(51) Int. Cl.[7] .......................... G10L 21/06; G10L 15/22; G10L 15/04; G10L 13/08
(52) U.S. Cl. ...................... 704/270; 704/246; 704/251; 704/258; 704/270.1
(58) Field of Search ................................ 704/231, 251, 704/255, 270–275, 270.1, 258, 246

(56) References Cited

U.S. PATENT DOCUMENTS

| | | | | |
|---|---|---|---|---|
| 4,776,016 A | * | 10/1988 | Hansen | 704/275 |
| 5,822,405 A | * | 10/1998 | Astarabadi | 704/270.1 |
| 5,909,666 A | * | 6/1999 | Gould et al. | 704/255 |
| 6,119,087 A | * | 9/2000 | Kuhn et al. | 704/275 |
| 6,219,645 B1 | * | 4/2001 | Byers | 704/275 |
| 6,246,985 B1 | * | 6/2001 | Kanevsky et al. | 704/270 |
| 6,249,765 B1 | * | 6/2001 | Adler et al. | 704/275 |

* cited by examiner

Primary Examiner—Richemond Dorvil
Assistant Examiner—Daniel Nolan
(74) Attorney, Agent, or Firm—Harley R. Ball; Steven J. Funk; Kevin D. Robb

(57) ABSTRACT

A system and method for customizing the operating characteristics of a speech recognition system with characteristics of a user device. The user device transmits information representing the operating characteristics of itself to the speech recognition system. The speech recognition system determines the speech characteristics of the user device from this information. The speech recognition system obtains the speech characteristics relating to the device from a database and configures the speech recognition system with these characteristics.

29 Claims, 8 Drawing Sheets

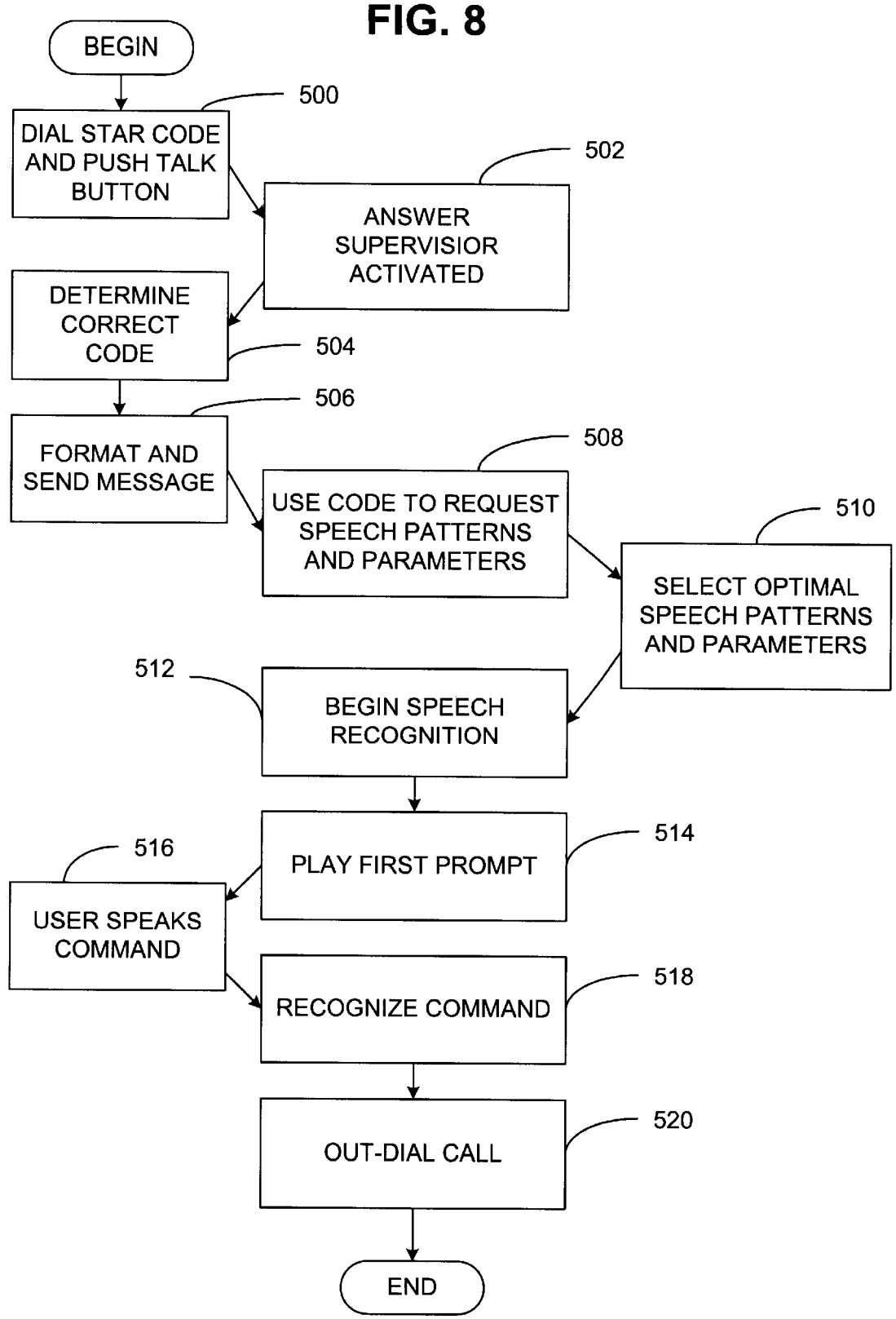

SPEECH RECOGNITION THAT ADJUSTS AUTOMATICALLY TO INPUT DEVICES

BACKGROUND OF THE INVENTION

1. Field of the Invention

The present invention relates to speech recognition methods and systems and more particularly to methods and systems whereby a speech recognition system is automatically configured. In an exemplary embodiment, the invention provides a method and system whereby a speech recognition unit within a speech recognition system is automatically configured with speech models and parameters associated with a particular user device.

2. Description of Related Art

Network-based speech recognition is used by customers for many tasks, including placing calls by speaking phrases. For example, a customer might say "Call John Smith," and the speech recognition system places a phone call to John Smith. Alternatively, a customer might say "Dial 555–1234," which causes that telephone number to be dialed. Speech recognition can be used in conjunction with other services as well. For example, a customer might want to retrieve and manage his or her voicemail messages by speaking certain phrases. In addition, a customer might use speech recognition to access his or her records in a financial institution and retrieve account information and balances.

Speech recognition has important advantages for customers of telecommunication services. For example, customers need no longer consult a telephone book or list to match a telephone number with a particular name. The customer need only say the name, and the number is automatically dialed. In addition, a customer stating the number will have the number automatically dialed thereby eliminating the possibility of misdialing the number.

Conventional speech recognition systems comprise modules to recognize speech phrases. They also contain a database where speech models are stored. A speech recognition algorithm uses speech models and other parameters stored in the database to recognize voice messages. Speech models are created by recording thousands of speech utterances from human subjects. Each speech model is a mathematical model of a particular sound or collection of sounds in the language of these utterances. For example, a speech model can be created for each phoneme in the language, or for each of the "diphones" (i.e., two-phoneme groupings) in a language, or for larger sets of phoneme groupings such as "command words" or "command phrases" that need to be recognized by a speech recognition system.

Different types of devices are used by customers to send messages to speech recognition systems. For example, the customer may state a phrase through a telephone handset that is connected to a landline telephone line. Alternatively, the customer may place a call by using a hands-free device such as a speaker phone. Different technologies are also used for various user devices. For example, the customer may use a wireless CDMA handset, or a wireless CDMA speaker phone from within the mobile vehicle.

Speech recognition systems also have other features with adjustable parameters. For example, a "barge-in" feature refers to the situation where a user speaks a command when an announcement is playing over the phone. The "barge-in" feature stops the announcement and the command is then recognized by the speech recognition system. The "barge-in" feature typically has certain configurable parameters. For instance, for barge-in, the length and volume of sound energy may be configurable parameters.

The quality of voice communication varies based on type of user device and the technology used with a particular user device. For example, a handset in which the microphone is held within a few inches of the speaker's mouth will have a different sound quality than a device with a more distant microphone such as a speaker phone.

The technology used and the medium over which the transmission is sent also affects the quality of reception. For example, the technology associated with a landline phone offers a different sound quality than the technologies associated with a digital PCS call or analog cellular phone call. In addition, the environment associated with the wireless units may provide more interference and background noise than the environment associated with the landline unit.

Because of these differences in quality of reception between various units, the inventor has discovered that the speech models and parameters that achieves high-quality recognition for one type of device, technology, or environment may not achieve high quality recognition if used to recognize speech for other types of devices, other technologies, or other environments. For example, speech models appropriate for a landline device may not be appropriate for a hands-free unit. Additionally, speech models that closely matches the attributes for a CDMA device may be inappropriate for a non-CDMA device.

In addition, because of these differences in quality between various units, the parameters associated with a particular feature for different device types may be different. For instance, the models associated with barge-in that are appropriate for a landline device may not be appropriate for a hands-free unit. Similarly, the parameters associated with barge-in that are appropriate for a CDMA device may be inappropriate for a non-CDMA device.

SUMMARY OF THE INVENTION

The present invention provides a method and system whereby a user device having an associated device type sends a message with this device type to a network-based speech recognition system. The network-based speech recognition system is then optimized for the particular user device using speech models and parameters associated with the device type.

In one embodiment of the present invention, a user device sends an initial message to a speech recognition system. Examples of user devices include landline handsets, landline speaker phones, CDMA handsets, and CDMA speaker phones. The speech recognition system responds to the initial message from the user device with an acknowledgement. In response to the acknowledgement, the user device transmits a message to the speech recognition system describing its device type. For instance, if the user device were a speaker phone using CDMA technology, a message including this information would be sent to the speech recognition system.

The speech recognition system includes a speech recognition unit. The speech recognition unit obtains the speech models and parameters associated with the device type from a database. The speech recognition unit receives these models and parameters from the database and is configured with them. The user device then transmits, and the speech recognition unit receives, a voice message. The speech recognition unit uses the configured models and parameters to process the voice messages from the user device. Thus, the method and system can automatically configure a speech recognition unit within a speech recognition system with speech models and parameters associated with a particular user device.

In another embodiment of the present invention, the speech recognition system includes a services module. The services module is activated by the user's voice commands. For example, the services module may automatically outdial phone calls. Thus, if the command requests that a particular call be outdialed, the services module outdials the correct call.

In yet another embodiment, the voice command requests that a service be accessed by the speech recognition system. For example, the voice message may request that a voice-mail system be accessed or that account balances from a financial institution be retrieved.

These as well as other features and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 8 is a flowchart of the operation of the automatic speech recognition system according to principles of the present invention.

DETAILED DESCRIPTION OF EXEMPLARY EMBODIMENTS

Figure 1:
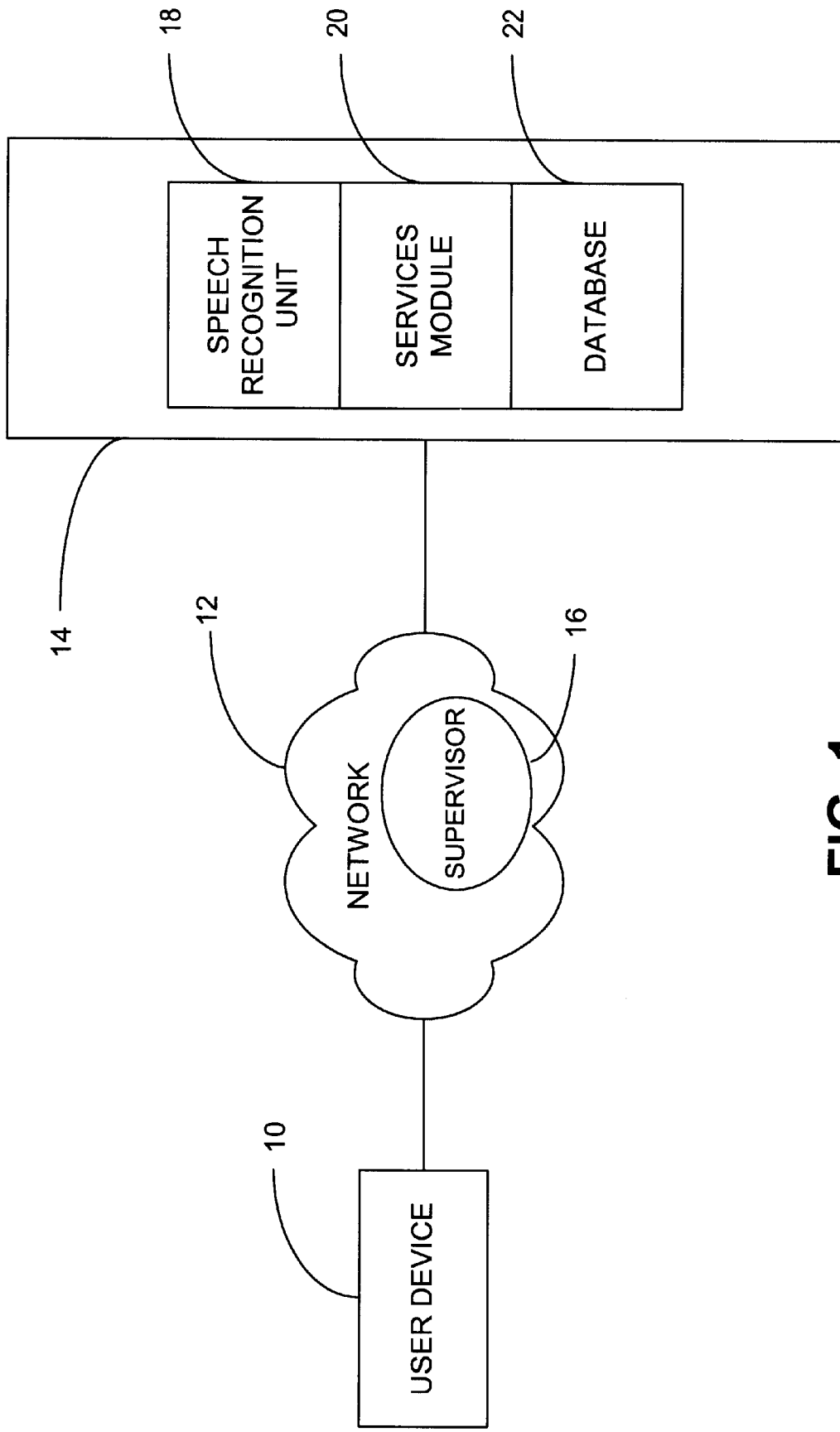
FIG. 1 is a block diagram of the speech recognition system, in accordance with an exemplary embodiment of the present invention.

Referring now to FIG. 1, an exemplary embodiment of the automatic speech recognition system is described.

A user device 10 is communicatively coupled to a network 12. The user device 10 is any type of a device capable of transmitting voice messages. The user device 10 may also use various types of message transmission technologies.

Each user device has an associated device-type reflecting the characteristics of the user device. For example, the user device 10 may be a handset operating on a landline; a hands-free unit operating on a landline; a handset using CDMA technology; a hands-free unit using CDMA technology; a handset using AMPS technology; or a hands-free unit using AMPS technology. The user device 10 can also be a personal computer or a similar device.

In addition, the user device 10 may be a wireless phone that is built into a vehicle (a "telematics unit"). The vehicle has an audio system and hands-free microphone. The wireless phone uses the hands-free microphone of the vehicle to receive voice messages from the user. The wireless phone also uses the audio system of the vehicle to broadcast voice messages to the user. An example of a telematics unit is the ONSTAR system manufactured by General Motors. Other examples of user devices are possible as well.

Communications between the user device 10 and the network 12 are initiated and managed by a signaling mechanism. The signaling mechanism used is preferably a standardized mechanism used in the telecommunications industry. The signaling mechanism may also communicate information sufficient to describe the device-type of the user device 10.

Common Channel Signaling System No. 7 (SS7 or C7) can be used as the signaling mechanism. SS7 is a global standard for telecommunications defined by the International Telecommunications Union (ITU) Telecommunication Standardization Sector (ITU-T). The standard defines the procedures and protocols by which network elements exchange information to effect wireless and wireline setup, routing, and control. In addition, variants of SS7 exist such as those defined by the American National Standards Institute (ANSI), Bell Communications Research (Bellcore), and the European Telecommunications Standards Institute (ETSI). Of course, the signaling used in this invention is not limited to SS7 or any particular type; the specific type of signaling used will depend on the exact nature and characteristics of the network and the applications desired.

The network 12 is any type of communications network. In addition to carrying voice messages, the network 12 can carry data as well. The network 12 may be a public network or a private network. The network 12 can connect to other networks having the same or different attributes.

The network 12 comprises a supervisor 16. The supervisor 16 receives, sets-up, and manages communications with the user device 10. The supervisor 16 picks-up received calls from the user device 10 and forwards voice messages from the user device 10 to a speech recognition system 14. Instead of being part of the network 12, the supervisor 16 may be part of the speech recognition system 14.

The network 12 is communicatively coupled to the speech recognition system 14. The speech recognition system 14 comprises a speech recognition unit 18, a services module 20, and a database 22. The speech recognition system 14 can be comprised of other modules as well. However, for clarity, only the aforementioned modules will be described in relation to FIG. 1. Also, for clarity, the speech recognition system 14 is shown as being separate from the network 12. However, the speech recognition system 14 may also be considered a node in the network 12. In other words, the speech recognition system 14 may also be viewed as part of the network 12.

The speech recognition unit 18 recognizes the voice message received from the user device 10. The speech recognition unit 18 is configured with speech models and parameters, which allow the speech recognition unit 18 to recognize voice messages from the user device 10.

The database 22 stores speech models and parameters, which are used to configure the speech recognition unit 18. The database 22 comprises a storage device. In addition, the database 22 comprises a retrieval mechanism that allows the speech models and parameters to be retrieved from the storage device. Particular codes in the database may represent particular device-types. For example, the code "110" may be used to represent that the user device is a landline handset.

The services module 20 provides services in response to the receipt of the voice message from the user device 10. For example, the service provided may be outdialing a telephone call. Alternatively, the speech recognition system 14 may provide access to systems and services. In other words, the services module 20 may be configured to access systems or services provided at locations separate from the services module 20. One example of a system accessed is a voicemail system. An example of a service accessed is an account balance service at a financial institution. Other examples of both systems and services exist as well.

The user device 10 announces its presence (using a "presence message") to speech recognition system 14 via network 12. A purpose of the presence message is to inform the speech recognition system 14 that a user device 10 is present and that the user device 10 desires to transmit a voice message to the speech recognition system 14.

The supervisor 16 receives the presence message transmitted from the user device 10. The supervisor 16 also produces an acknowledgement message granting service to the user device 10 in response to the presence message. The supervisor 16 additionally transmits voice messages received from the user device 10 to the speech recognition system 14.

The user device 10 then transmits its device-type to the supervisor 16. The supervisor 16 communicates this information to the speech recognition system 14. The speech recognition unit 18 is configured with speech models and parameters from the database 22 that correspond to the device-type. The speech recognition unit 18 recognizes and determines the contents of the voice message. Finally, the services module 20 is activated as needed, based upon the contents of the voice message.

Figure 2:
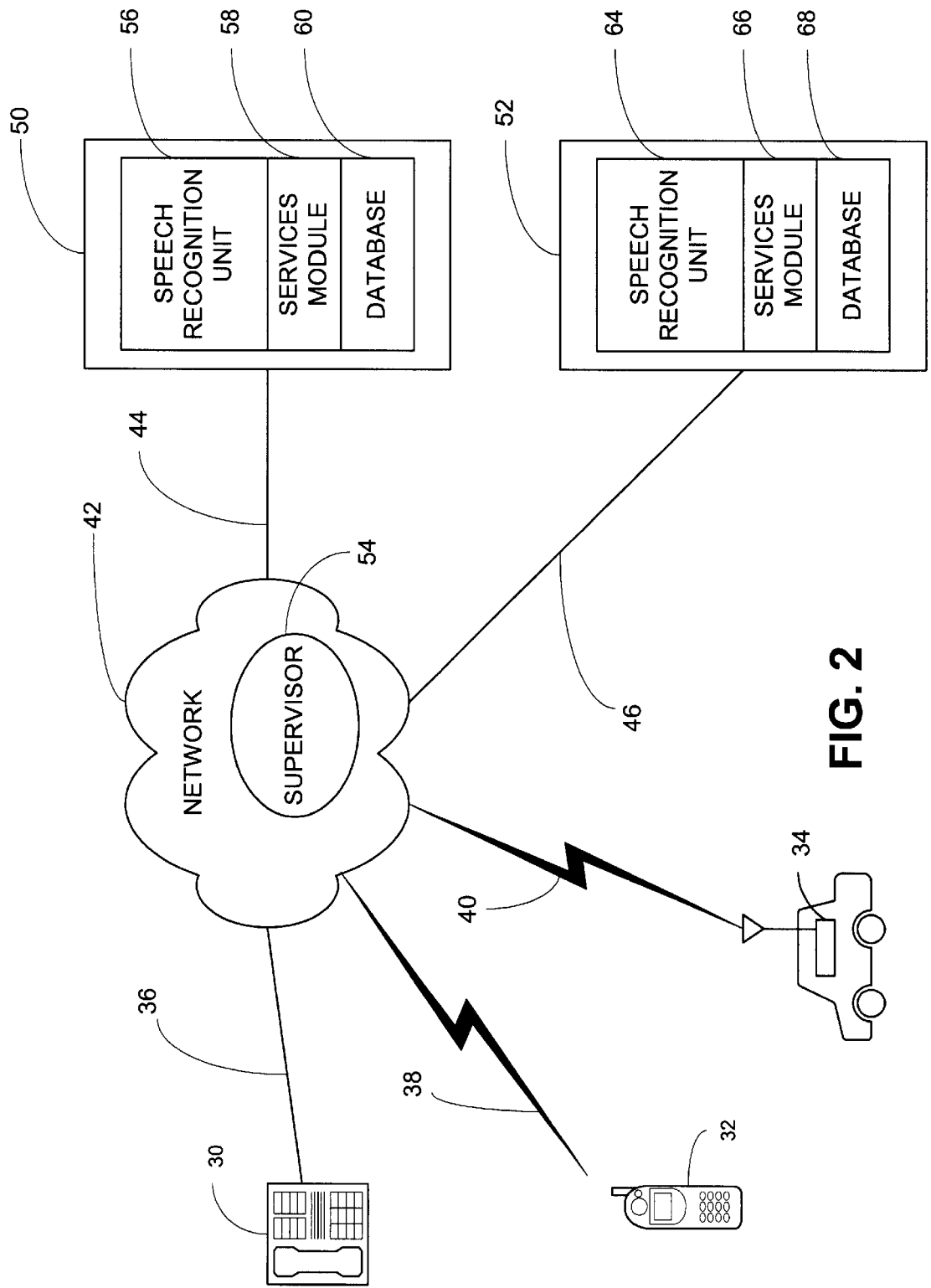
FIG. 2 is a block diagram of the speech recognition system in accordance with an exemplary embodiment of the present invention.

Referring now to FIG. 2, an exemplary embodiment of a speech recognition system 50 or 52 is described with reference to multiple user devices and multiple speech recognition systems. Multiple user devices, shown by way of example as landline unit 30, a cellular telephone 32 and a hands-free speaker phone in vehicle 34, are coupled to a communication network 42. The coupling to the network 42 is accomplished by communication links 36, 38, and 40, respectively.

The hands-free speaker phone in the vehicle 34 can be a telematics unit. The telematics unit comprises a wireless phone that is built into a vehicle. The vehicle has an audio system and hands-free microphone. The wireless phone uses the hands-free microphone of the vehicle to receive voice messages from the user. The wireless phone also uses the audio system of the vehicle to broadcast voice messages to the user. An example of a telematics unit is the ONSTAR system manufactured by General Motors. Other examples of user devices are possible as well.

As shown in FIG. 2, communication link 36 is a landline telephone communication link. For example, the link 36 may be a communication cable constructed of copper wire, fiber, or other materials as is known in the art. Communication links 38 and 40 are radio links over the air as used in cellular communications systems. Although links 36, 38, and 40 are shown as specific types of links in FIG. 2, other types of links may be substituted for the types illustrated. For example, link 36 may be a radio link. Also, other types of user devices may be added to FIG. 2 or replace the devices 30, 32 and 34.

Communications between the user devices 30, 32, and 34 and the network 42 are initiated and managed by a signaling mechanism. The signaling mechanism used is preferably a standardized mechanism used in the telecommunications industry. The signaling mechanism may also communicate information sufficient to describe the device-type of user device 30, 32, or 34.

One purpose of network 42 is to switch and route the transmissions from the user devices 30, 32, and 34 to speech recognition systems 50 or 52. Although two speech recognition systems 50 or 52 are shown, it will be understood by those skilled in the art that any number of speech recognition systems may be coupled to the network 42.

The routing of transmissions with the network 42 can be accomplished using switches. The user devices 30, 32 and 34 include routing information in messages sent over links 36, 38, and 40. This routing information allows switches within the network 42 to route the message to the correct destination (speech recognition system 50 or 52).

Like network 12, the network 42 is any type of communications network. In addition to carrying voice messages, the network 42 can carry data as well. The network 42 may be a public network or a private network. The network 42 can connect to other networks having the same or different attributes.

The network 42 comprises a supervisor 54. The supervisor 54 receives, sets-up, and manages communications with the user devices 30, 32, and 34. The supervisor 54 picks-up received calls from the user devices 30, 32, and 34 and forwards voice messages from the user devices 30, 32, and 34 to speech recognition systems 50 or 54. Instead of being part of the network 42, the supervisor 54 may be part of the speech recognition systems 50 or 54.

The network 42 is communicatively coupled to the speech recognition system 50. The speech recognition system 50 comprises a speech recognition unit 56, a services module 58, and a database 60. The speech recognition system 50 can be comprised of other modules as well. However, for clarity, only the aforementioned modules will be described in relation to FIG. 2. Also, for clarity, the speech recognition system 50 is shown as being separate from the network 42. However, the speech recognition system 50 may also be considered a node in the network 42. In other words, the speech recognition system 50 may also be viewed as part of the network 42.

The speech recognition unit 56 recognizes the voice message received from the user devices 30, 32, and 34. The speech recognition unit 56 is configured with speech models and parameters, which allow the speech recognition unit 56 to recognize voice messages from the user devices 30, 32, and 34. The speech recognition unit 56 is configured with operating characteristics to match the type of device that transmits the voice message.

The database 60 stores speech models and parameters, which are used to configure the speech recognition unit 56. The database 60 comprises a storage device. In addition, the database 60 comprises a retrieval mechanism that allows the speech models and parameters to be retrieved from the storage device. Particular codes may represent particular device-types. For example, the code "110" may be used to represent that the user device is a landline handset.

The services module 58 provides services in response to the receipt of the voice message from the user devices 30, 32, and 34. For example, the service provided may be outdialing a telephone call. Alternatively, the speech recognition system 50 may provide access to services. In other words, the services module 58 may be configured to access systems or services provided at locations separate from the services module 58. One example of a system accessed is a voicemail system. An example of a service accessed is an account balance service at a financial institution. Other examples of both systems and services exist as well.

A user devices 30, 32, or 34 announces its presence (using a "presence message") to a speech recognition system 50 via a network 42. A purpose of the presence message is to inform the speech recognition system 50 that a user device 30, 32, or 34 is present and that a user device 30, 32, or 34 desires to transmit a voice message to the speech recognition system 50.

The supervisor 54 receives the presence message transmitted from the user devices 30, 32, or 34. The supervisor 54 also produces an acknowledgement message granting service to the user devices 30, 32, or 34 in response to the presence message. The supervisor 54 additionally transmits voice messages received from the user devices 30, 32, or 34 to the speech recognition system 50.

The user device 30, 32, or 34 then transmits its device-type to the supervisor 54. The supervisor 54 communicates this information to the speech recognition system 50. The speech recognition unit 56 is configured with speech models and parameters from the database 60 that correspond to the device-type. The speech recognition unit 56 recognizes and determines the contents of the voice message. Finally, the services module 58 is activated as needed, based upon the contents of the voice message.

Speech recognition system 52 comprises a speech recognition unit 64, services module 66, and a database 68. It will be understood that the purpose and functions of the speech recognition unit 64, services module 66 and database 68 are similar to the purposes and functions of speech recognition unit 56, services module 58, and database 60. However, it will also be recognized that the detailed functionality of these elements may be different. For example, the services module 58 may access services provided by a financial institution while the services module 66 access services provided by a telecommunications carrier.

Figure 3:
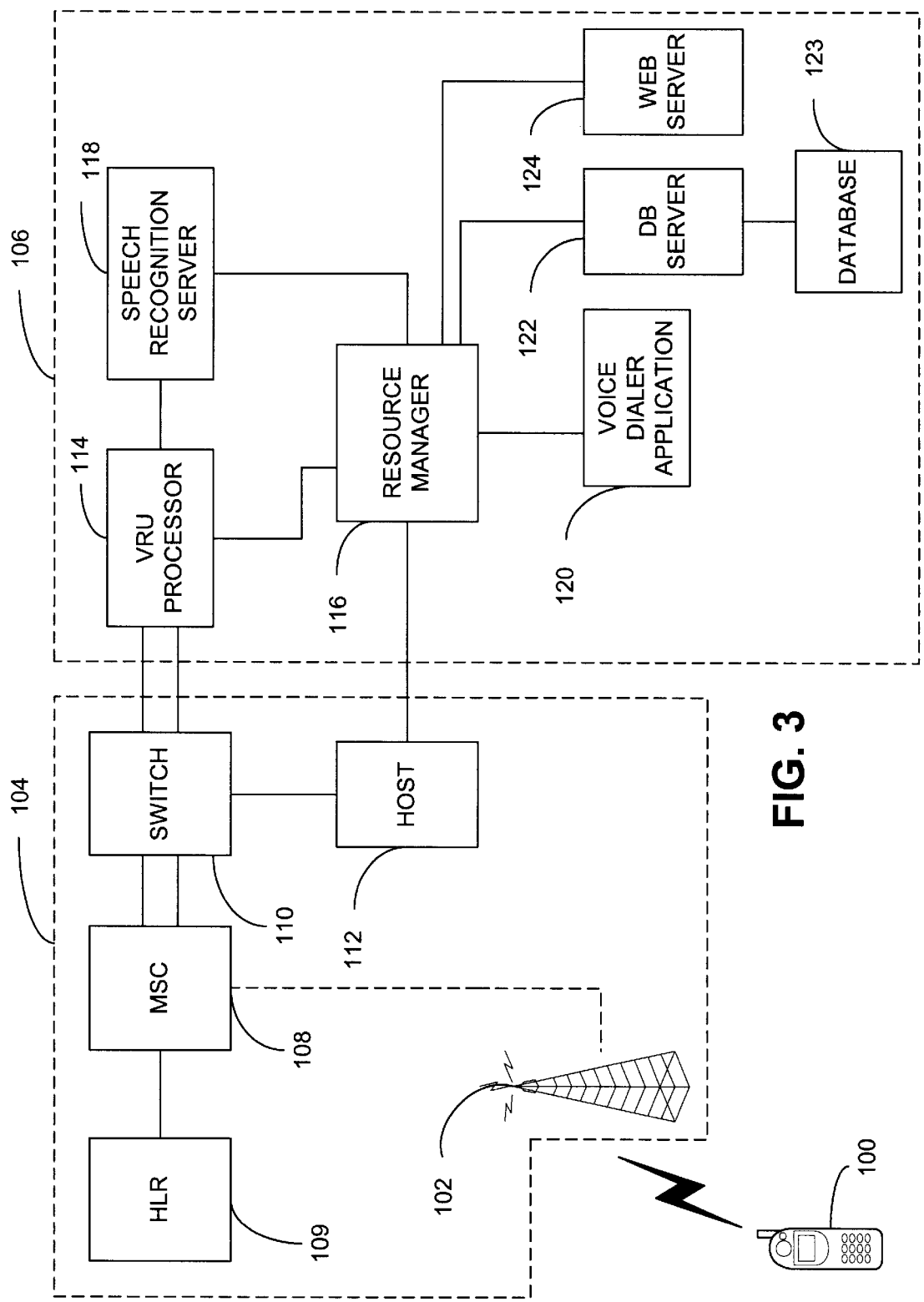
FIG. 3 is a block diagram of the speech recognition system showing network interconnections and components in accordance with an exemplary embodiment of the present invention.

Referring now to FIG. 3, an exemplary embodiment of the automatic speech recognition system showing network interconnections is described. A cellular telephone 100 is coupled via an air interface to a base station 102. The base station 102 is coupled via a T1 line to a mobile switching center (MSC) 108. The MSC 108 is coupled to a switch 110 via a trunk, for example, a T1 voice activated dialing (VAD) link. The MSC 108 is also coupled to a home location register (HLR) 109. The switch 110 is coupled, via a signaling link, to a host 112.

The base station 102, MSC 108, switch 110, HLR 109, and host 112 comprise a network 104. The network 104 may be comprised of sub-networks, with the MSC 108 being in one sub-network and the switch 110 being in another sub-network. The sub-networks may be operated by different telecommunication carriers. For instance, the first sub-network may be operated by a long distance service provider while the second sub-network may be operated by a local service provider.

The cellular telephone 100 is any type of cellular telephone employing any type of message transmission technology. The cellular telephone 100 transmits a voice message received from a user to the base station 102. The voice message contains instructions to call a telephone number.

The cellular telephone 100 may be a hand-held unit or a hands-free unit. An example of a hands-free unit is a telematics unit. The telematics unit comprises a cellular phone that is built into a vehicle. The vehicle has an audio system and hands-free microphone. The cellular phone uses the hands-free microphone of the vehicle to receive voice messages from the user. The cellular phone also uses the audio system of the vehicle to broadcast voice messages to the user. An example of a telematics unit is the ONSTAR system manufactured by General Motors. Other examples of user devices are possible as well.

The base station 102 is any type of base station capable of transmitting and receiving cellular telephone transmissions including the voice message received from the cellular telephone 100. Illustratively, the base station 102 is of the type manufactured by Motorola, Inc. of Schaumburg, Ill.

The MSC 108 can comprise control, authentication, and billing functions. However, some or all of these functions may be distributed between the base station 102 and the MSC 108. Illustratively, the MSC 108 is a Lucent or Nortel MSC.

The HLR 109 comprises a database of information relating to the user and the cellular telephone 100. For example, the database within the HLR 109 includes the telephone number of the cellular telephone 100.

The switch 110 routes calls between the MSC 108 and other locations inside and outside of the network 104. The switch 110 may also comprise control, authentication, and billing features. The switch 110 may be any that is known in the art, for example, the Metro One Excel switch manufactured by Excel Switching Corporation of Hyannis, Mass.

The host 112 comprises a supervisor. The function of the supervisor 16 and 54 is the same as described above in relation to FIGS. 1 and 2.

The network 104 includes or is coupled to a speech recognition system 106. The speech recognition system 106 comprises a VRU processor 114, a speech recognition server 118, a resource manager 116, a voice application dialer 120, a DB server 122, and web server 124.

The VRU processor 114 is coupled to the resource manager 116 and the speech recognition server 118. The resource manager 116 is also coupled to the speech recognition server 118, the voice dialer application 120, the DB server 122, and the web server 124. The DB server 122 is coupled to a database 123. The database 123 stores speech models and parameters.

In addition, elements of the network 104 are coupled to the speech recognition system 106. Specifically, the switch 110 is coupled to the VRU processor 114 and the host 112 is coupled to the resource manager 116.

The VRU processor 114 transmits and receives calls from the switch 110. The VRU processor 114 also receives voice messages from the switch 110. The VRU processor 114 is illustratively an IBM VRU implemented on an IBM RS/6000 server and manufactured by the International Business Machines Corporation of Armonk, N.Y.

The resource manager 116 manages information flow in the speech recognition system 106. For example, the resource manager 116 transfers information between the DB server 122 and the speech recognition server 118. The resource manager 116 transfers information between the other components of the speech recognition system 106 as well. The resource manager 116 may also be implemented on an IBM RS/6000 server.

The speech recognition server 118 recognizes voice messages received from the VRU processor 114. Illustratively, the speech recognition server 118 is a Nuance speech recognition server manufactured by Nuance Communications of Menlo Park, Calif.

The voice application dialer 120 determines phone numbers or other destination addresses contained in voice messages recognized by the speech recognition server 118. Illustratively, the voice application dialer 120 is of the type manufactured by IBM of Armonk, N.Y.

The DB server 122 retrieves speech models and parameters from the database 123. Illustratively, the DB server 122 is a DB2 server manufactured by IBM of Armonk, N.Y.

The web server 124 provides a connection between the speech recognition system 106 and the Internet. Illustratively, the web server 124 is a WEBSPHERE server manufactured by IBM of Armonk, N.Y.

The operation of the system of FIG. 3 is now described. A user makes a call on the cellular telephone 100. The base station 102 receives the call. The call can be originated by the user pressing star and the "talk" buttons on the cellular telephone 100 or any other suitable symbol or combination of symbols. The user may access a VAD or other similar service.

The call by the user may automatically be connected to a VAD service. However, in an alternate embodiment, the user specifically requests the use of a VAD service. In particular, after originating the call, the cellular telephone user accesses a VAD service and requests to make a VAD call. The user may dial a specific number, which accesses a VAD service. After accessing the VAD service, the user speaks a voice message into the cellular telephone 100.

The base station 102 receives and converts the voice message received from the cellular telephone 100 for transmission over a T1 line to the MSC 108. After receipt of the voice message, the MSC 108 transfers the message to the switch 110.

The switch 110 communicates with the host 112, where the supervisor is activated. The supervisor (within the host 112) sends an acknowledgement message through the switch 110 and MSC 108 to the base station 102. The base station 102 then transmits the acknowledgement message to the cellular telephone 100. The cellular telephone 100 next transmits its device-type information (via a "device-type" message) through the MSC 108 to the switch 110. For example, the cellular telephone 100 may be programmed to automatically dial (autodial) the device-type code representing its device-type. The switch 110 forwards the device-type message to the host 112.

The host 112 then communicates with the resource manager 116 to properly configure the speech recognition system 106 with the correct speech models and parameters based upon the device-type information in the device-type message. In turn, the resource manager 116 instructs the DB server 122 to retrieve speech models and parameters from the database 123 that correspond to the device-type of the cellular telephone 100.

After the voice message is transmitted from the cellular telephone 100, the host 112 communicates with the resource manager 116 informing the resource manager 116 that a voice message (identified as a voice-activated dialing (VAD) message by the user) has been transmitted by the cellular telephone 100. Specifically, the host 112 sends a message to the resource manager 116 that a VAD call is waiting at a VRU processor 114. The resource manager 116 communicates with the VRU processor 114 and informs the VRU processor 114 of any information needed to complete the call. This information may include the phone number ("ANI") of the calling party.

The voice message is transferred from the VRU processor 114 to the speech recognition server 118. The speech recognition server 118 performs speech recognition with the models received from the resource manager 116 and then sends the results to the resource manager 116. The resource manager 116 communicates the results to the voice dialer application 120, which determines the phone number to be dialed and communicates this number to the resource manager 116. The resource manager 116 sends a request to make the connection specified by the number to the host 112 and VRU processor 114. The VRU T1 channel (used to communicate the voice message) is then dropped by the VRU processor 114.

Provided with a knowledge of the phone number to be dialed, the host 112 then communicates with the switch 110 and obtains an outbound T1 trunk. The switch 110 then outdials the number on the outbound trunk. The connection between the cellular telephone 100 is then made.

Figure 4:
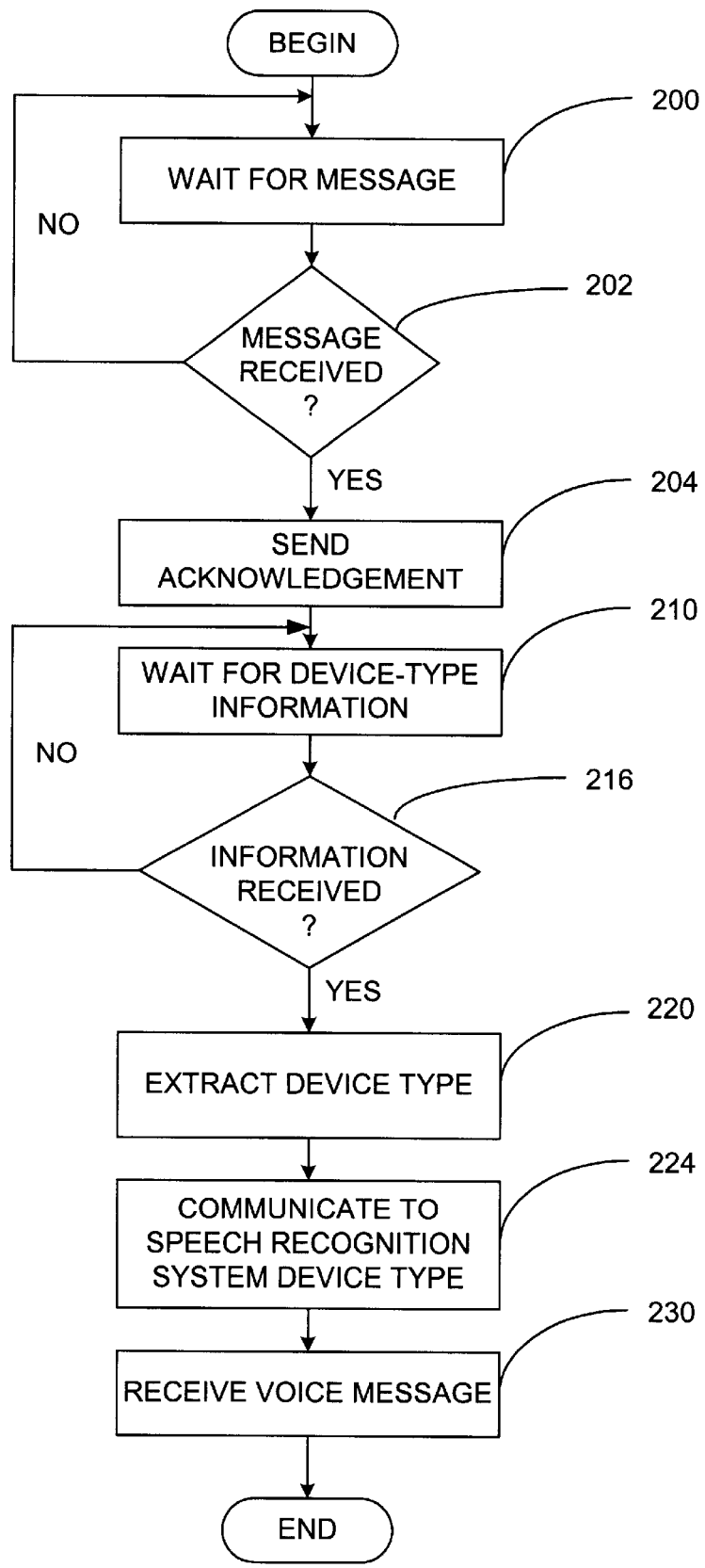
FIG. 4 is flowchart showing the operation of the supervisor in accordance with an exemplary embodiment of the present invention.

Referring now to FIG. 4, the operation of the supervisor is now described. At step 200, the supervisor waits for a presence message to be received from a user device. The presence message is sent when the user device is activated to make a call. For example, if the user device is a cellular telephone, then the presence message might be sent when the star and "talk" buttons are pressed by the user on the cellular telephone. At step 202, the supervisor determines whether a presence message has been received. If the answer is negative, then control returns to step 200 and the supervisor waits for a presence message to be received. If the answer at step 202 is affirmative, then execution continues with step 204.

At step 204, the supervisor sends an acknowledgement message to the user device. The acknowledgement message communicates to the user device that the supervisor has been activated and is ready to receive device-type information. Then, at step 210, the supervisor waits to receive the device-type information from the user device. The device-type information received from the user device identifies the device-type of the user device. The information may be communicated using a signaling mechanism, for example, by using SS7. Alternatively, the information might be communicated using a separate device-type message, for example, by using an autodial feature of the phone. At step 216, the supervisor determines if a device-type information has been received from the user device. If the answer is negative, at step 216, the control returns to step 210 and the supervisor continues to wait to receive device-type information from the user device. If the answer at step 216 is affirmative, then execution continues with step 220.

At step 220, the supervisor may extract the device-type information just received from the user device in the device-type message. The information may be in any number of forms, for example, in coded numbers. If the information has already been communicated to the supervisor via a signaling mechanism, step 220 may be omitted. Then, at step 224, the supervisor communicates the device-type information to the speech recognition system. Next, at step 230, the supervisor receives the voice message and forwards the message to the speech recognition system for further processing.

Figure 5:
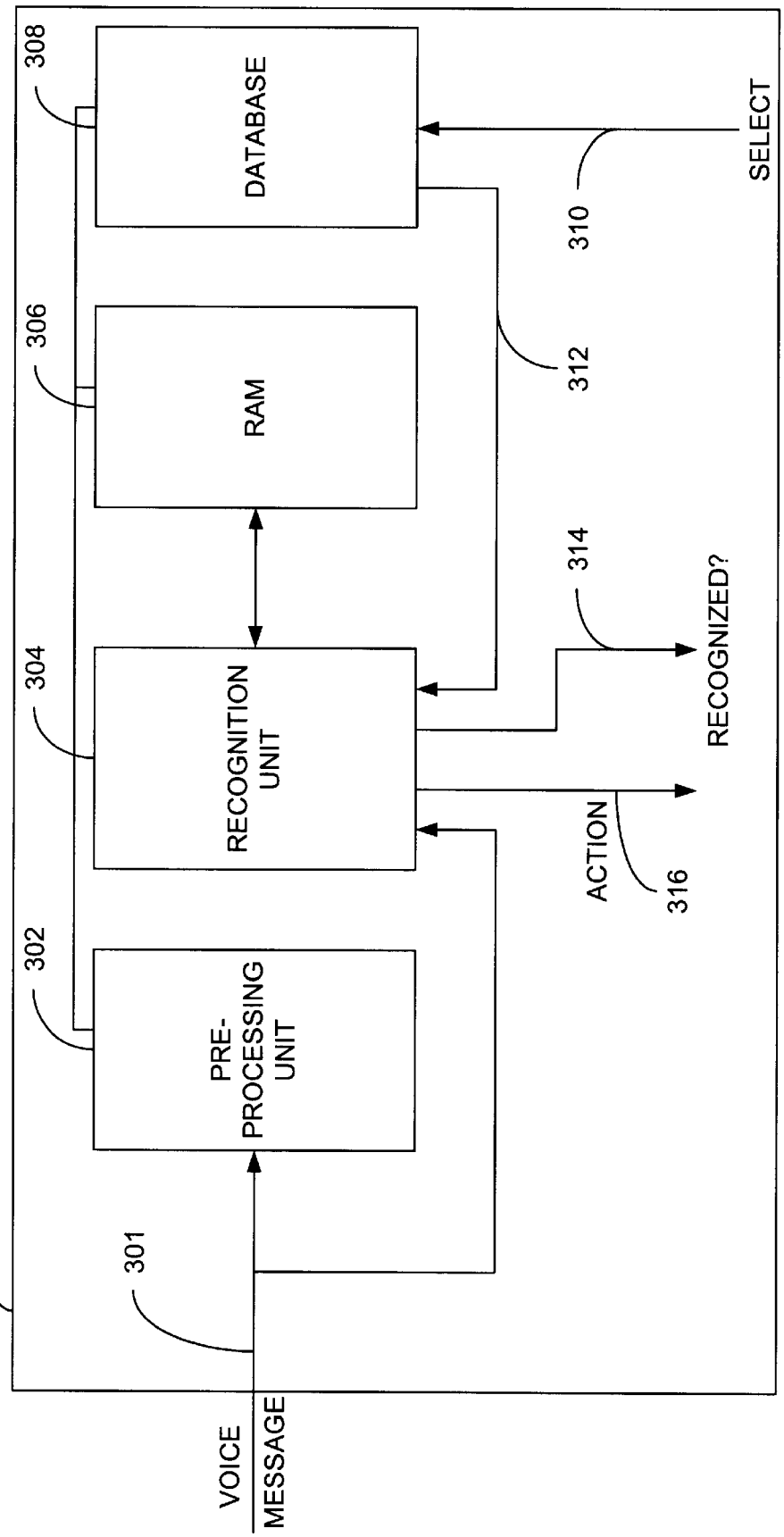
FIG. 5 is a block diagram of the speech recognition unit in accordance with an exemplary embodiment of the present invention.

Referring now to FIG. 5, an exemplary embodiment of the speech recognition unit is described. The speech recognition unit 300 comprises a preprocessing unit 302. The preprocessing unit 302 is coupled to a recognition unit 304, a RAM 306, and a database 308.

A purpose of the preprocessing unit 302 is to extract information needed by other elements in the system from the voice message received over a lead 301 from a user device. For instance, the preprocessing section 302 may extract call information from the voice message for a resource manager to use. Examples of call information include the phone number ("ANI") of the calling party.

The recognition unit 304 recognizes the voice message received over the lead 301 using the optimized speech models and parameters from a database 308. The recognition unit 304 can be any type of device known to those skilled in the art and used to recognize human speech. For example, an exemplary unit is that manufactured by the Nuance Communications of Menlo Park, Calif. that performs speech recognition.

The RAM 306 provides temporary storage for the data processed by the recognition unit 304. The database 308 comprises a non-volatile memory that stores the speech models and parameters used by the recognition unit 304 to recognize the received message. Although shown as part of the speech recognition unit 300, it will be understood that the database 308 may be separate from the speech recognition unit 300. In other words, the database 308 may be at a location distinct from the speech recognition unit 300. The database 308 also includes functionality that accesses the speech models and parameters in the permanent memory. The coupling allows the sharing of information between different entities (e.g., with the resource manager).

A lead 310 is used to communicate information which is used to select the optimum parameters. The lead 310 contains information identifying a device-type of a user device. This information is used by the database 308 as an index to select the models and parameters corresponding to the device-type. After the selection is made, the correct models and parameters are loaded into the recognition unit 304 over a lead 312.

When the recognition unit 304 has completed its processing, a lead 314 is used to unsuccessful determination has been made, then further processing may be halted. The lead 314 may be illustratively coupled to the resource manager.

Upon a successful recognition result, an action lead 316 is used to communicate the required action. Action lead 316 may be connected to a services module. For example, the action lead 316 may specify that a phone call is to be outdialed. It will be understood by those skilled in the art that sufficient information will be provided over the action lead 316 to allow for the action to be undertaken by any service used or accessed by the system.

Figure 6:
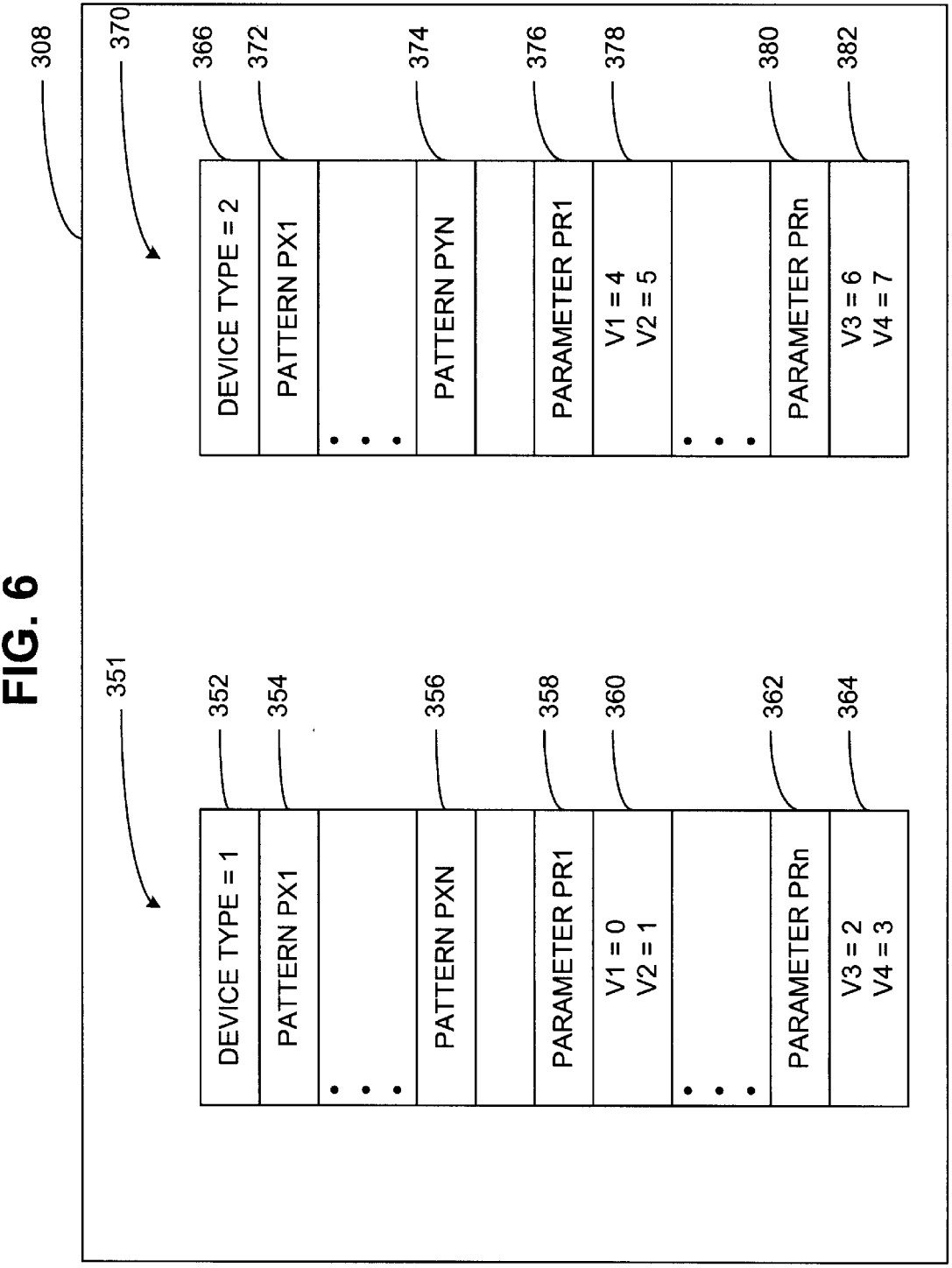
FIG. 6 is a block diagram of the database in accordance with an exemplary embodiment of the present invention.

Referring now to FIG. 6, the database 308 is now described. Illustratively, the database 308 comprises a plurality of records 351 and 370. Although only two records are shown in the database 308, it will be understood by those skilled in the art that any number of records can exist in the database 308.

The general organization of the database 308 is now described. A purpose of the database 308 is to store speech models and parameters in records. Each record contains models and parameters corresponding to a particular device-type. The records contain sections comprising the speech models and parameters, which correspond to the particular device-type. It will be recognized that the database 308 need not be organized exactly as shown in FIG. 6. Any number of organizational schemes are possible.

Specifically, the record 351 comprises a device-type field 352 that identifies the type of a user device. In this case, the device type is 1. The record also contains a plurality of model fields 354, 356 and 358 representing the speech models available for use by the speech recognition system. The actual number of model fields can be tens, hundreds, thousands or tens of thousands, or more, to match the individual phonemes of a language, diphones, words, or phrases that are used by the speech recognition system.

The record 351 also comprises a parameter field 358 and data associated with that parameter in a data field 360. The data in the data field 360 corresponds to variables associated with parameter PR1. These variables are set to particular values. In this case, the values set for variables V1 and V2 are 0 and 1, respectively. Of course, it will be recognized by those skilled in the art that any number of variables can be contained in the data fields. In addition, the values of any variable in the database can be any numeric value (e.g., positive, negative, real, integer) as known in the art.

The record 351 contains a plurality of parameter fields up to and including a parameter field 362 for a parameter PRn that has a data field 364. The data field 364 has two variables V3 and V4 that are associated with the parameter PRn. The values associated with V3 and V4 are 2 and 3, respectively.

The second record 370 contains a device-type field 366. In this case, the device type is 2. The record also contains a plurality of model fields 372, 374 and 376 representing the number of models available for use by the system. As with record 351, the actual number of model fields vary to match the individual phonemes of a language, diphones, or phrases that are used by the speech recognition system.

The record 370 also comprises a parameter field 376 and data associated with that parameter in a data field 378. The data in the data field 378 corresponds to variables associated with parameter PR1 set to particular values. In this case, the values set for variables V1 and V2 are 4 and 5, respectively. Of course, it will be recognized by those skilled in the art that any number of variables can be contained in the data fields.

The record 370 contains a plurality of parameter fields up to and including a parameter field 380 for a parameter PRn that has a data field 382. The data field 382 has two variables V3 and V4 that are associated with the parameter PRn. In this case, the values of V3 and V4 have been set to 6 and 7, respectively.

Figure 7:
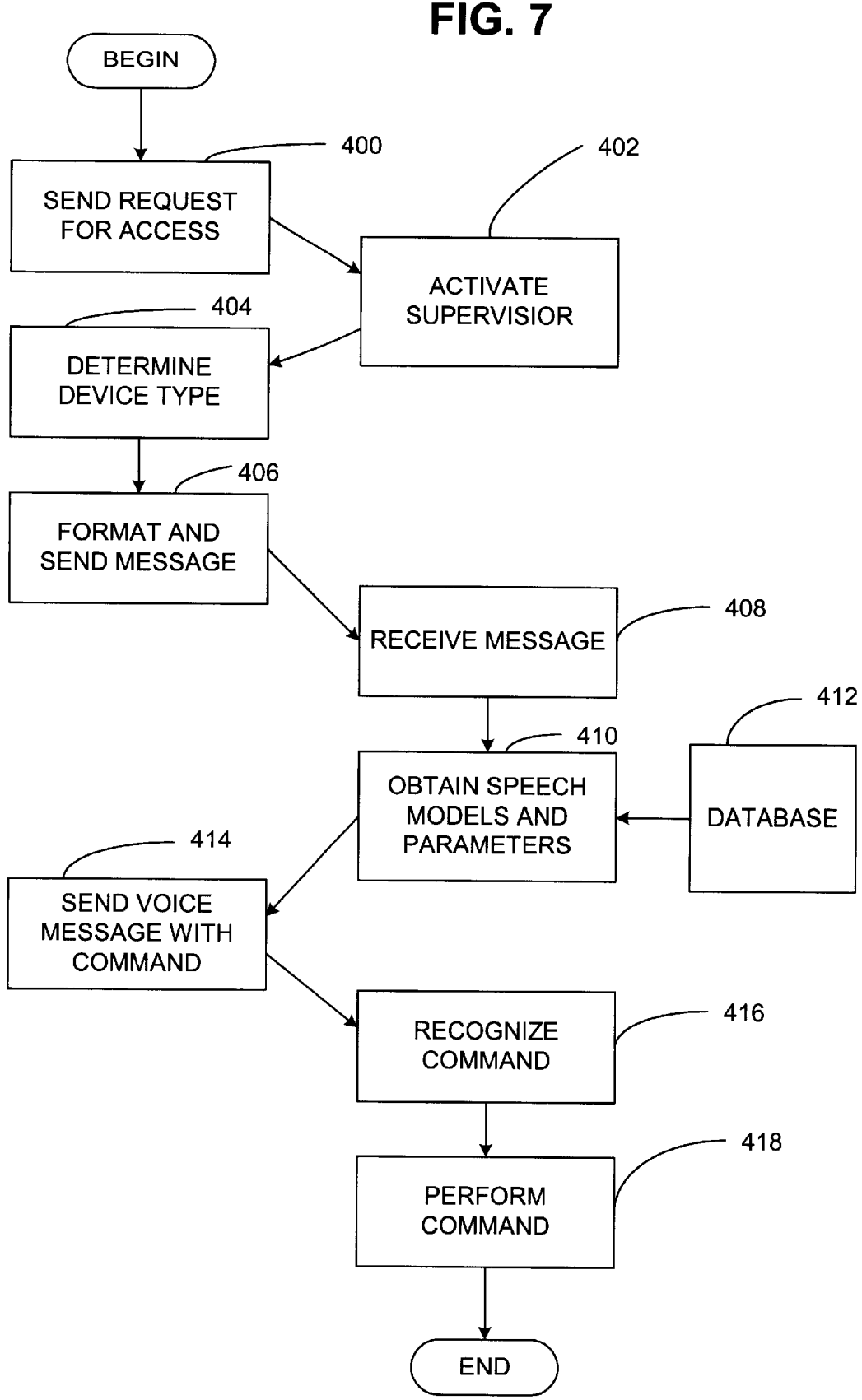
FIG. 7 is a flowchart of the operation of the automatic speech recognition system according to principles of the present invention.

Referring now to FIG. 7, the operation of the speech recognition system is described. At step 400, a user device sends an access request to the speech recognition system. The request for access is in the form of a presence message. Next, at step 402, a supervisor is activated in response to receiving the presence message. The supervisor picks up the line when the request for access is made (by the presence message) and received from the user device. The supervisor sends an acknowledgement to the user device. Then, at step 404, the device-type of the user device is determined. Preferably, the determination is automatically made by the user device. Next, at step 406, a device-type message, containing the message type of the user device, is formatted and sent to the speech recognition system. The message may be of any type that is known in the art that is used to transmit device-type data. For example, tones such as DTMF tones may be used. Preferably, the message is automatically sent upon receipt of the acknowledgment from the supervisor. For example, the telephone may autodial a device-type code. Alternatively, the signaling mechanism (used in communications between the user device and the network) may communicate information sufficient to describe the device-type of the user device.

At step 408, the speech recognition system receives the device-type message from the user device. The device-type message is decoded, if needed, and the device-type information is extracted from the message, if needed. Then, at step 410, the supervisor uses the device-type information to obtain the correct speech models and parameters. The models and parameters are obtained from a database 412.

At step 414, a user speaks a voice message containing a command into the user device. At step 416, a speech recognition unit within the speech recognition system executes a recognition algorithm using the speech models and parameters obtained from the database 412. Next, at step 418, the nature of the command in the voice message is determined by the speech recognition system. A services module is used to execute the command. For example, if the requested application is to make a call, the call is placed by the services module. Alternatively, the speech recognition system can access other systems to perform the command. For example, if the application is to access voice mail, a voice mail system is accessed.

Referring now to FIG. 8, the operation of the speech recognition system is described as it relates to a telecommunications system having cellular telephones. At step 500, a user, from a cellular telephone, dials a star button (and creates a presence message). The star button is one mechanism a user announces that a transmission is about to commence from the cellular telephone to a network coupled to the cellular telephone. Alternatively, other mechanisms can be used. For example, on many cellular telephones a "talk" button is pressed by a user to begin a transmission or the "talk" button can be pressed in combination with the star button.

At step 502, an answer supervisor is activated in response to receiving the presence message and sends an acknowledgement message to the cellular telephone. At step 504, the cellular telephone receives the acknowledgement message and determines the correct code to transmit back to the answer supervisor (in a device-type message). For example, if three digits are used and the user device is a cellular CDMA device, "111" may be the correct code. At step 506, the device-type message is formatted and sent to the answer supervisor. For example, the cellular telephone may autodial the code.

At step 508, the answer supervisor receives the device-type message, recognizes the code, and prepares a request to the database for the correct speech models and parameters corresponding to the device-type (specified by the code). At step 510, a database look-up is performed to obtain the correct speech model and parameters.

The speech recognition unit contains configurable parameters that are loaded from the database. At step 512, speech recognition begins, when the speech recognition unit receives the parameters and speech models from the database. At step 514, a prompt is played for the user. For example, the prompt "Please state your message now" may be played. Then, at step 516, the user speaks a voice message containing a command. For example, the user may say "Dial 555–1234" or "Dial John Smith."

At step 518, a speech recognition unit recognizes the command in the voice message. For example, the speech recognition unit determines that the command is to dial a number (555–1234) or a person (John Smith). The speech recognition determines the phone number to call if the command does not specify the actual phone number to call. In recognizing the command, the speech recognition unit uses the speech models and parameters downloaded from the database.

Finally, at step 520, the telephone call specified in the command is outdialed and the connection is made. Of course, it will be understood by those skilled in the art that other types of actions and services may be undertaken or performed at step 520. For example, services such as voice mail may be accessed at step 520.

As in most telecommunications applications, those skilled in the art will appreciate that many of the elements described herein are functional entities that may be implemented as discrete components, in any suitable combination and location. Further, various functions described herein as being performed by one or more entities may be carried out by a processor executing an appropriate set of machine language instructions stored in memory. Provided with the present disclosure, those skilled in the art can readily prepare appropriate computer instructions to perform such functions.

Exemplary embodiments of the present invention have been illustrated and described. It will be understood, however, that changes and modifications may be made to the invention without deviating from the spirit and scope of the invention, as defined by the following claims.

I claim:

1. A method for customizing configurable parameters of a speech recognition system with operating characteristics associated with a user device comprising the steps of:

supplying a user device, said user device having a device type;

supplying a speech recognition system, said speech recognition system having configurable parameters;

transmitting information representing said device type of said user device from said user device to said speech recognition system;

supplying a database and storing in said database said operating characteristics associated with said user device of said device type;

obtaining said operating characteristics of said user device from said database based upon said information representing said device type; and configuring said configurable parameters of said speech recognition system with said operating characteristics.

2. The method of claim 1 comprising the further steps of:

receiving a voice message from said user device; and recognizing the contents of said voice message using said operating characteristics.

3. The method of claim 2 comprising the further step of: activating a service in response to recognizing the contents of said voice message.

4. The method of claim 3 wherein said service is a voice mail system.

5. The method of claim 3 wherein said contents of said voice message requests a call to be outdialed and whereby the method further comprises the steps of determining connection information for said call and outdialing said call based upon said connection information.

6. A method for configuring a speech recognition unit comprising the steps of:

supplying a user device having operating characteristics;

supplying a speech recognition unit having configurable parameters;

sending a presence message from said user device to said speech recognition unit, wherein said presence message indicates the need for service from said user device;

responding to said presence message with an acknowledgement message;

in response to said acknowledgement message, determining a code which describes said operating characteristics of said user device;

sending said code to said speech recognition unit in a device-type message;

receiving said device-type message and extracting said code from said device-type message;

in response to said step of receiving said device-type message, determining a speech characteristic model corresponding to said code;

sending said speech characteristic model to said speech recognition unit;

configuring said configurable parameters of said speech recognition unit with said speech characteristic model;

sending a voice message whereby said voice message contains instructions to dial a number;

processing said voice message and determining said number; and outdialing a call to said number.

7. A speech recognition system comprising:

a plurality of user devices, each of said user devices having an associated device type, said user devices comprising cellular and landline phones;

a database, said database storing speech characteristics based upon said type of said device;

a communication network coupled to said user devices and receiving messages from said user devices, said messages specifying said device type, said plurality of user devices communicatively coupled to said network;

speech recognition means coupled to said database and said communication network for receiving messages from said network and having updateable parameters;

speech adaptation means coupled to said speech recognition means comprising a speech recognition unit for automatically updating said parameters of said speech recognition means with speech models and parameters corresponding to the type of selected ones of said plurality of user devices; and service means for performing network services, said service means being activated by said speech adaptation means, said service means including means for outdialing phone calls and accessing a voicemail system.

8. A speech recognition system comprising:

a user device, said user device having an associated type;

a database, said database storing speech characteristics based upon said type of said user device;

a communication network coupled to said user device and receiving messages from said user device, said user device communicatively coupled to said communication network;

speech recognition means coupled to said database and said communication network for receiving messages from said network, said speech recognition means having configurable parameters; and speech adaptation means for automatically updating said configurable parameters of said speech recognition means with said speech characteristics from said database, said speech characteristics corresponding to said type of said user device.

9. The system of claim 8 further comprising service means for performing network services, said service means being activated by said speech adaptation means.

10. The system of claim 9 wherein said service means places a telephone call.

11. The system of claim 9 wherein said service means comprises a voice mail system.

12. The system of claim 8 wherein said speech characteristics comprise a plurality of speech models and feature parameters.

13. The system of claim 8 wherein said user device is a selected one of a landline handset, landline speaker phone, cellular handset, or cellular speaker phone.

14. The system of claim 8 wherein said user device is a telematics unit.

15. The system of claim 8 wherein said speech adaptation means includes a supervisor, said supervisor receiving messages from said user device, said messages specifying the type of said user device.

16. A system for updating parameters of a speech recognition unit comprising:

a user device, said user device having an associated type;

a database, said database storing speech characteristics based upon said type of said user device;

a communication network coupled to said user device and receiving messages from said user device, said user device communicatively coupled to said communication network;

a speech recognition unit, said speech recognition unit receiving messages from said communication network, said speech recognition unit coupled to said communication network and said database, said speech recognition unit having configurable parameters, said speech recognition unit automatically updating said configurable parameters with said speech characteristics from said database, said characteristics corresponding to said type of said user device.

17. The system of claim 16 further comprising a services module, said services module performing network services.

18. The system of claim 17 wherein said services module places a telephone call.

19. The system of claim 17 wherein said services module comprises a voice mail system.

20. The system of claim 16 wherein said speech characteristics comprise a plurality of speech models and feature parameters.

21. The system of claim 16 wherein said user device is a selected one of a landline handset, landline speaker phone, cellular handset, or cellular speaker phone.

22. The system of claim 16 wherein said user device is a telematics unit.

23. The system of claim 16 wherein said communication network further comprises a supervisor, said supervisor receiving messages from said user device, said messages specifying the type of said user device.

24. A method for customizing the operating characteristics of a speech recognition system with characteristics of a user device comprising the steps of:

supplying a user device having a device type;

supplying a speech recognition unit having updateable parameters;

transmitting a message from said user device requesting service;

responding to said message with an answer wherein said answer grants service to said user device;

transmitting information representing said device type of said user device from said user device to said speech recognition system;

determining the speech characteristics of said user device from said information;

obtaining the speech models and parameters relating to said user device from a database;

and updating the parameters of said speech recognition unit with said speech characteristics.

25. The method of claim 24 wherein said user device is a selected one of a landline handset, landline speaker phone, cellular handset, or cellular speaker phone.

26. The method of claim 24 comprising the further steps of:

receiving a voice message from said user device; and recognizing the contents of said voice message.

27. The method of claim 26 comprising the further step of:

activating services in response to recognizing the contents of said voice message.

28. The method of claim 27 wherein said contents of said voice message requests a call to be outdialed and whereby the method further comprises the steps of determining connection information for said call and outdialing a call based upon said connection information.

29. The method of claim 27 wherein said services include a voice mail system.

* * * * *